United States Patent [19]

Zenker

[11] Patent Number: 4,842,127
[45] Date of Patent: Jun. 27, 1989

[54] CHAIN CONVEYOR

[75] Inventor: Hartwig Zenker, Aalen, Fed. Rep. of Germany

[73] Assignee: RuD-Kettenfabrik Rieger & Dietz GmbH & Co., Aalen, Fed. Rep. of Germany

[21] Appl. No.: 145,539

[22] Filed: Jan. 19, 1988

[30] Foreign Application Priority Data

Jan. 30, 1987 [DE] Fed. Rep. of Germany ....... 3703214

[51] Int. Cl.4 .............................................. B65G 17/36
[52] U.S. Cl. .................. 198/712; 198/803.01
[58] Field of Search ................... 198/712, 731, 803.01, 198/803.2

[56] References Cited

FOREIGN PATENT DOCUMENTS

| 1922146 | 11/1970 | Fed. Rep. of Germany . | |
| 2209736 | 1/1980 | Fed. Rep. of Germany . | |
| 3502946 | 7/1986 | Fed. Rep. of Germany ...... | 198/712 |
| 8502312 | 7/1986 | Fed. Rep. of Germany . | |
| 2034115 | 12/1970 | France . | |
| 0755698 | 8/1980 | U.S.S.R. ............................. | 198/712 |
| 1155520 | 5/1985 | U.S.S.R. ............................. | 198/712 |
| 1429222 | 3/1976 | United Kingdom ................ | 198/712 |

Primary Examiner—Robert J. Spar
Assistant Examiner—D. Glenn Dayoan
Attorney, Agent, or Firm—Mark P. Stone

[57] ABSTRACT

In a chain conveyor having at least one chain strand, U-shaped connecting schackles (5), which in each case enclose a sidepiece (6) of a chain link (3) oriented perpendicularly to the chain wheel axis, serve to connect chain links (3) with conveying members (4). In order to ensure a safe and firm connection, the sidepiece (6) of the chain link (3) enclosed by the connecting shackle (5) rests in a support and guide bed (14), arranged on the conveying member (4) and partly enclosing it, of a component (13) which is provided with a recess (15) which is opposite to a recess (11) in the curvature (10) of the connecting shackle (5).

18 Claims, 2 Drawing Sheets

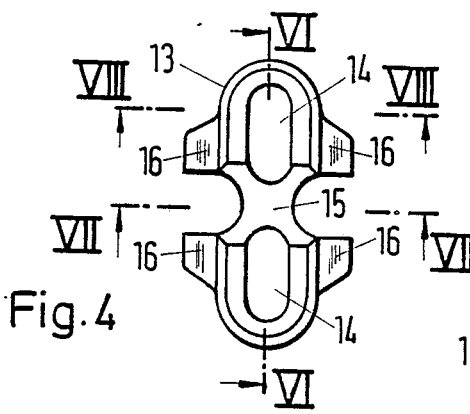
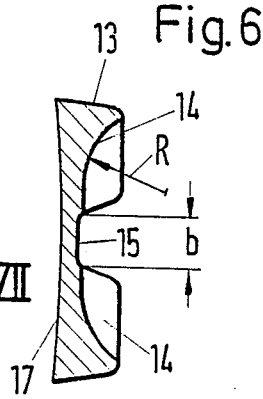
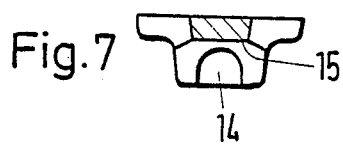
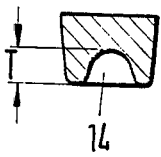
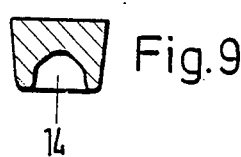
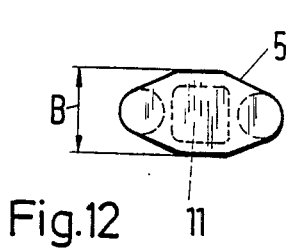
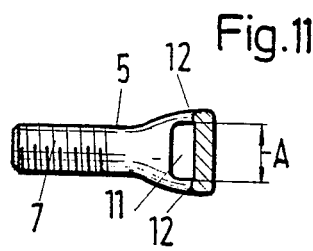
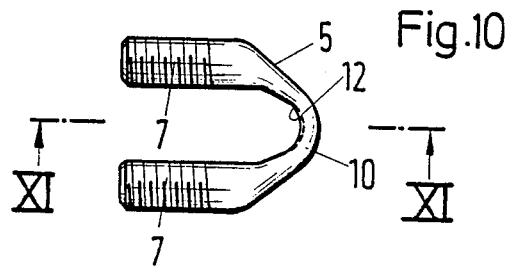

CHAIN CONVEYOR

BACKGROUND OF THE INVENTION

The invention relates to a chain conveyor having at least one chain strand which can be driven by a toothed chain wheel and consists of oval chain links, particularly round steel links, in which conveying members, particularly buckets, are screwed to the respective chain strand in each case by means of a single U-shaped connecting shackle provided with a thread at both its ends, the connecting shackles in each case enclosing a straight part of a sidepiece of a chain link aligned perpendicularly to the chain wheel axis, and this straight part resting in a support and guide bed provided with a recess in the region of its middle, this bed being formed by a component which is detachably connected to the conveying member and whose base facing the conveying link is slightly concave.

German Utility Model No. 85/02,312 has disclosed a chain conveyor of the abovementioned type in which connecting shackles are used which are bent from round steel and are flattened on the side of their curvature facing the chain link. In this case the width of the flattened portion is less than the width of the recess in the support and guide bed. In the known design undesirable deformations of the straight part of the chain link sidepiece encompassed by the connecting shackle may occur under certain conditions, e.g. in the event of an unfavorable positioning and design of the weld reinforcement of the chain link and the application of high tensile forces.

In another chain conveyor disclosed by German Offenlegungsschrift No. 1,922,146 pairs of so-called flange dogs serve to connect the conveying members to the chain strands, the flanges of the said flange dogs being pressed by a central threaded bolt against the respectively opposite sides of the two sidepieces of a vertical link. In this case each flange bears on the link sidepieces via four clamping jaws which are arranged at a distance from one another and lie outside the region of the weld reinforcements, so that in this case there is no threat of disadvantageous deformations of the link sidepieces as may occur in the chain conveyor previously described. This second known design, with its inherent and inevitable four-point support, offers no suggestion however, not least with regard to its fundamentally different structure, regarding the redesign of a chain conveyor according to the preamble in which the conveying members are connected to only one link sidepiece in each case.

SUMMARY OF THE INVENTION

The object of the invention is to counter the deformations described in a chain conveyor of the type considered and to design the said chain conveyor in such a way that high tensile or clamping forces can be applied by means of the connecting shackles irrespective of the position of the weld reinforcement of the chain links. This object is achieved, according to the invention, in that the side of the curvature of the connecting shackle facing the straight part of enclosed chain link sidepiece is provided with a recess which is limited by lateral support webs, which serve to transmit the tensile forces from the connecting shackle to the chain link sidepiece.

In the chain conveyor according to the invention, substantial tensile and clamping forces can be applied because of the selected form of the connecting shackles, without jeopardizing the pair of the chain link enclosed by the connecting shackle. This is particularly the case when the width of the curvature of the connecting shackle, which curvature encloses the straight part of the chain link sidepiece in question, is greater than the width of the recess in the component, and when the support webs are at a distance apart which is at least equal to the width of the recess. In this case not only will no notching forces produced by the weld reinforcement be transmitted to the chain link sidepiece, but the latter is not even flexurally stressed in the region of the connection point by the tensile forces exerted in the connecting shackle. Consequently, the tensile forces can readily be selected to be sufficiently great to deform the concave base of the component facing the conveying member in such a way that virtually full-surface contact between component and conveying member is attained, and in this manner a first seating of the component on the conveying member is achieved.

BRIEF DESCRIPTION OF THE DRAWINGS

The invention is explained in detail below with reference to the attached drawing, in which:

FIG. 4 shows the plan view of a component belonging to the connecting point according to FIGS. 1 to 3 and forming a support and guide bed for a chain link;

FIG. 5 shows the end view of the component according to FIG. 4;

FIG. 6 shows a section along the line VI—VI in FIG. 4;

FIG. 7 shows a section along the line VII—VII in FIG. 4;

FIG. 8 shows a section along the line VIII—VIII in FIG. 4;

FIG. 9 shows a section, corresponding to FIG. 8, through a slightly modified component according to FIG. 4;

FIG. 10 shows the side view of a connecting shackle belonging to the connecting point according to FIGS. 1 to 3;

FIG. 11 shows a section along the line XI—XI in FIG. 10, and

FIG. 12 shows the plan view of the connecting shackle according to FIG. 10.

DESCRIPTION OF THE BEST MODES FOR CARRYING OUT THE INVENTION

Figure 1:
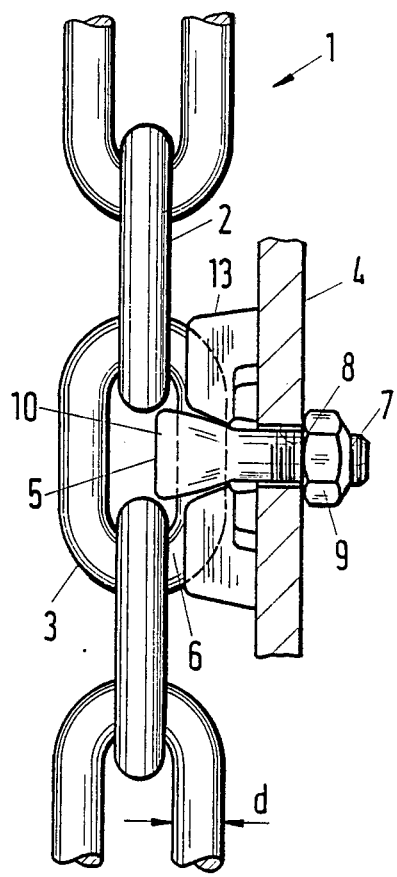
FIG. 1 shows, partly in section, a first lateral view of the connecting point between a conveying member and a chain strand of a chain conveyor.
Figure 2:
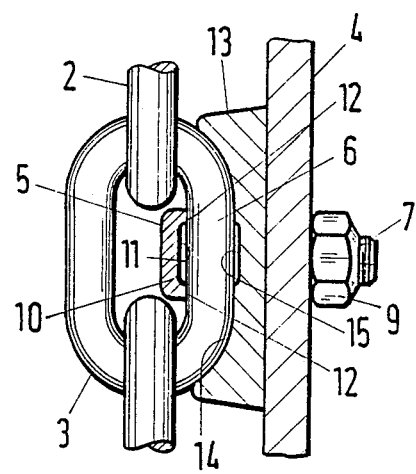
FIG. 2 shows, partly in section, a second lateral view of the connecting point according to FIG. 1.
Figure 3:
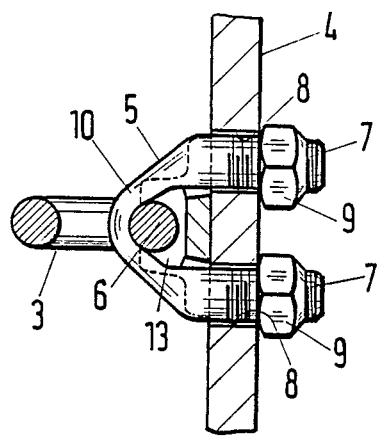
FIG. 3 shows, partly in section, the end view of the connecting point according to FIGS. 1 and 2.

In FIG. 1, part of a continuous chain strand of a chain conveyor is generally designated 1. The chain strand 1 consists of normal oval chain links 2 and 3. The chain links 2 are oriented parallel to the axis of a chain wheel (not shown) and the chain links 3 are perpendicular to the axis of this chain steel. In practice, the chain links 2, in which the teeth of the chain engage, are regularly described as horizontal links and the chain links 3 are regularly described as vertical links.

A conveying member 4 is fixed to each of certain chain links 3 and, when the chain conveyor is designed as a double-strand conveyor, is preferably formed by a bucket. The drawings show only part of the rear wall of a conveying member 4.

A U-shaped connecting shackle 5 serves to fix the conveying member 4 to a chain link 3 of the chain strand 1, this connecting shackle 5 enclosing the straight part of a sidepiece 6 of the chain link 3. The shackle arms 7, provided with a thread, of the connecting shackle 5 project through holes 8 in the conveying member 4 and are secured to nuts 9 on the side of the conveying member 4 remote from the chain strand 1. The connecting shackle 5 is preferably designed as a forging. FIGS. 10 to 12 show details of its construction. Its curvature 10, connecting the shackle arms 7, has a width B and is provided with a recess 11 which is limited by lateral support webs 12 extending parallel to one another at a distance A. The width B and the distance A are measured in a plane perpendicular to a plane passing through the center of the curvature (10) and the arms (7) of the shackle (5), as can be seen from FIGS. 10–12 of the drawing. The cross sectional areas of the curvature 10 and of the shackle arms 7, which determine the strength of the connecting shackle 5, are substantially equal. In view of the flat design of the curvature 10, on the other hand, its rigidity is less than the rigidity of the shackle arms 7, which has a favorable effect in that the shackle curvature 10 can adapt well to the periphery of the sidepiece 6 of the chain link 3 which it encloses.

A component 13, whose structure is apparent from FIGS. 4 to 9, is detachably arranged between the conveying member 4 and the chain link 3. The component 13 forms a support and guide bed 14, whose depth T is preferably at least equal to half the link thickness d/2 and at most equal to the full link thickness d of the sidepiece 6 of the chain link 3. In order to ensure that the sidepiece 6 of the chain link 3 is also well supported in the support and guide bed 14, the latter is provided in the region of its centre with a recess 15 whose width b, measured in the region of the bottom of the recess (15) in a plane perpendicular to a plane passing through the center of the curved portion (10) and the arms (7) of the shackle as can be seen from FIGS. 10–12 of the drawing, is preferably not greater, but rather smaller, than the distance A between the support webs 12. The width B of the curvature (10) is greater than the width (b) of the recess (15) of the component (13). The end regions of the support and guide bed 14 have a radius R which corresponds to the external radius of the curvatures of the chain link 3. The chain link 3 consequently lies, with its sidepieces 6, in the support and guide bed 14 so as to be largely secured against displacement. Because of the comparitively great depth T of the support and guide bed 14 (cf. FIG. 8) the chain link 3 is automatically aligned to the conveying member 4.

Guide forks 16 formed by lateral projections serve to adjust the component 13 on the conveying member 4.

As can be seen from FIG. 6, the base 17 of the component 13, which base faces the conveying member 4, is of slightly concave design. In this manner, elastic deformation of the component 13 occurs when the connecting shackle 5 is screwed tight to the conveying member 4 or to the strap reinforcing the rear wall thereof, if appropriately high tensile forces are used. The consequence is that the transmission of force takes place by a combination of frictional and positive fitting.

FIG. 9 shows a slightly modified, i.e. prismatic, cross-section of the support and guide bed.

I claim:

1. Chain conveyor comprising at least one chain strand having oval chain links, including round steel links, which can be driven by a toothed chain wheel, and having a single U-shaped connecting shackle having a curved portion (10) and two parallel arms (7) each of which having a thread at its end, said chain conveyor further comprising conveying members, including buckets, each of said buckets being screwed to said at least one chain strand by said connecting shackle, said connecting shackle enclosing a straight part of one leg of a chain link aligned perpendicularly to the rotational axis of the chain wheel, said chain conveyor further including a support guide bed formed by a component which is detachably connected by said connecting shackle to said conveying member whose base facing said conveying member is slightly concave, said straight part of said one leg resting in said support and guide bed, said support and guide bed defining a recess in the center region thereof, said connecting shackle having lateral support webs (12) limiting a recess (11) provided on the side of the curved portion (10) of the connecting shackle (5) which faces the straight part of said one leg of the chain link enclosed by the shackle (5), said lateral support webs (12) serving to transmit forces from the connecting shackles (5) to the leg (6) of the chain link enclosed by said shackle (5) to aid in preventing deformation of said chain link during operation of the conveyor.

2. Chain conveyor as claimed in claim 1 wherein the width (B) of the curved portion (10) of the connecting shackle (5) which encloses the straight part of said one leg of said chain link is greater than the width (b) of the recess (15) of the component (13) forming said support guide and bed measured in the region of the bottom of the recess of said component, said support webs (12) being at a distance (A) from one another which is at least equal to the width (b) of the recess (15) in said component (13), both said width (b) of the curved portion (10) and said width (b) of the recess (15) and the distance (A) being measured in a plane perpendicular to a plane passing the center of the curved portion (10) and the arms (7) of the shackle (5).

3. Chain conveyor as clained in claim 1 wherein the cross-sectional area of the curved portion (10) of the connecting shackle (5) is equal to the cross-sectional area of each of the parallel shackle arms (7).

4. Chain conveyor as claimed in claim 1 wherein the connecting shackle (5) is designed as a casting or forging.

5. Chain conveyor as claimed in claim 1 wherein the support and guide bed (14) has a depth (T) which is at least equal to half the link thickness (d/2) and at most equal to the full thickness (d) of a chain link (3) of said at least one chain strand.

6. Chain conveyor as claimed in claim 1 wherein the support and guide bed (14) is provided with at least one end region adapted to the curvatures of the chain link resting in said support and guide bed.

7. Chain conveyor as claimed in claim 1 wherein the support and guide bed (14) forms a guard against displacement of the leg (6) of the chain link (3) enclosed by said shackle (5).

8. Chain conveyor as claimed in claim 1 wherein the component (13) detachably connected to the conveying member is provided with guide forks (16) for the connecting shackle (5).

9. Chain conveyor as claimed in claim 1 wherein the connecting shackle (5) forms, in the region of said curved portion (10), a flat bridge connecting the shackle arms (7) to one another, said shackle arms having a circular cross-sectional area.

10. Chain conveyor as claimed in claim 1 further including a plurality of chain strands which can be driven by said toothed chain wheel.

11. Chain conveyor as claimed 2 wherein the cross-sectional area of the curved portion (10) of the connecting shackle (5) is equal to the cross-sectional area of each of the parallel shackle arms (7).

12. Chain conveyor as claimed in claim 2 wherein the connecting shackle (5) is designed as a casting or forging.

13. Chain conveyor as claimed in claim 2 wherein the support and guide bed (14) has a depth (T) which is at least equal to half the link thickness (d/2) and at most equal to the full thickness (d) of a chain link (3) of said at least one chain strand.

14. Chain conveyor as claimed in claim 2 wherein the support and guide bed (14) is provided with at least one end region adapted to the curvatures of the chain link resting in said support and guide bed.

15. Chain conveyor as claimed in claim 2 wherein the support and guide bed (14) forms a guard against displacement of the leg (6) of the chain link (3) enclosed by said shackle (5).

16. Chain conveyor as claimed in claim 2 wherein the component (13) detachably connected to the conveying member is provided with guide forks (16) for the connecting shackle (5).

17. Chain conveyor as claimed in claim 2 wherein the connecting shackle (5) forms, in the region of said curved portion (10), a flat bridge connecting the shackle arms (7) to one another, said shackle arms having a circular cross-sectional area.

18. Chain conveyor as claimed in claim 2 further including a plurality of chain strands which can be driven by said toothed chain wheel.

* * * * *